US012450547B2

(12) United States Patent
Wirola et al.

(10) Patent No.: US 12,450,547 B2
(45) Date of Patent: Oct. 21, 2025

(54) PRINTABLE TRACKING DEVICE

(71) Applicant: HERE Global B.V., Eindhoven (NL)

(72) Inventors: Lauri Aarne Johannes Wirola, Tampere (FI); Peter Kueth, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 753 days.

(21) Appl. No.: 17/119,851

(22) Filed: Dec. 11, 2020

(65) Prior Publication Data
US 2021/0182782 A1    Jun. 17, 2021

(30) Foreign Application Priority Data
Dec. 13, 2019   (EP) ..................... 19216045

(51) Int. Cl.
*G06Q 10/0833* (2023.01)
*G06K 19/07* (2006.01)
*G06K 19/077* (2006.01)

(52) U.S. Cl.
CPC ..... *G06Q 10/0833* (2013.01); *G06K 19/0707* (2013.01); *G06K 19/0723* (2013.01); *G06K 19/07758* (2013.01)

(58) Field of Classification Search
CPC .......... G06Q 10/0833; G06K 19/0707; G06K 19/0723; G06K 19/07758
See application file for complete search history.

(56) References Cited

U.S. PATENT DOCUMENTS

| | | | |
|---|---|---|---|
| 8,289,138 B2 * | 10/2012 | Oget | H04M 1/72412 235/382 |
| 9,563,984 B2 | 2/2017 | Willis et al. | |
| 9,723,510 B1 * | 8/2017 | Beluri | H04W 24/02 |
| 9,729,193 B2 * | 8/2017 | Joshi | H04B 1/707 |
| 10,026,506 B1 * | 7/2018 | LaBorde | G06F 17/11 |
| 10,460,837 B1 * | 10/2019 | LaBorde | G06N 3/048 |
| 10,490,045 B2 * | 11/2019 | Forster | G08B 13/2417 |
| 10,701,555 B1 * | 6/2020 | Myers | H04W 52/0212 |

(Continued)

FOREIGN PATENT DOCUMENTS

| | | | | |
|---|---|---|---|---|
| CN | 104813189 A * | 7/2015 | | G01S 5/0218 |
| WO | WO-2015010976 A1 * | 1/2015 | | G01S 5/02 |
| WO | WO 2019/156681 A1 | 8/2019 | | |

OTHER PUBLICATIONS

Shyh-Jong Chung, "Synthesis and Design of a New Printed Filtering Antenna", published by IEEE Transactions on Antennas and propagation, vol. 59, No. 3, Mar. 2011 (Year: 2011).*

(Continued)

*Primary Examiner* — Omar Zeroual
(74) *Attorney, Agent, or Firm* — ALSTON & BIRD LLP

(57) ABSTRACT

An apparatus is disclosed that includes: at least one antenna; and a carrier. The carrier includes the at least one antenna, and the at least one antenna is formed by printing the at least one antenna on or to the carrier. The carrier is attachable to an asset to be tracked. The apparatus is configured to enable determining of at least one position estimate indicative of a current position of the apparatus. The at least one position estimate is determined, at least in part, based on one or more signals observable by the at least one antenna. A method for producing the apparatus, and a use of the apparatus are also provided.

20 Claims, 2 Drawing Sheets

(56) References Cited

U.S. PATENT DOCUMENTS

| | | | | |
|---|---|---|---|---|
| 10,821,350 | B1* | 11/2020 | Schukar | G06F 3/0346 |
| 11,301,800 | B1* | 4/2022 | Bhagwat | G06K 7/1413 |
| 2005/0246334 | A1* | 11/2005 | Tao | H04W 64/00 |
| | | | | 707/999.005 |
| 2005/0266855 | A1* | 12/2005 | Zeng | G01S 5/02521 |
| | | | | 455/456.1 |
| 2006/0208900 | A1* | 9/2006 | Tavassoli Hozouri | |
| | | | | H01Q 9/285 |
| | | | | 340/572.7 |
| 2010/0123581 | A1* | 5/2010 | Hatfield | G06K 19/07345 |
| | | | | 340/572.3 |
| 2010/0214071 | A1* | 8/2010 | Nagai | G06K 7/0008 |
| | | | | 340/10.1 |
| 2011/0233919 | A1* | 9/2011 | Gieschen | B42D 15/045 |
| | | | | 156/247 |
| 2012/0119159 | A1* | 5/2012 | Douglas | H05K 3/361 |
| | | | | 977/773 |
| 2013/0107042 | A1* | 5/2013 | Forster | G06K 19/07703 |
| | | | | 340/10.6 |
| 2014/0274139 | A1* | 9/2014 | Bilal | G01S 19/48 |
| | | | | 455/456.3 |
| 2015/0069133 | A1* | 3/2015 | Qian | G06K 19/022 |
| | | | | 235/492 |
| 2015/0116172 | A1 | 4/2015 | Fontecchio et al. | |
| 2015/0201500 | A1* | 7/2015 | Shinar | B29C 64/112 |
| | | | | 425/132 |
| 2015/0287247 | A1* | 10/2015 | Willis | G06K 19/07758 |
| | | | | 345/419 |
| 2015/0311922 | A1* | 10/2015 | Bakalski | H04B 1/006 |
| | | | | 455/552.1 |
| 2016/0067927 | A1* | 3/2016 | Voris | B29C 64/386 |
| | | | | 700/98 |
| 2017/0093037 | A1* | 3/2017 | West | H01Q 3/34 |
| 2017/0223506 | A1* | 8/2017 | Kim | H04W 64/00 |
| 2017/0343638 | A1* | 11/2017 | Jampani | G01S 5/02521 |
| 2018/0110012 | A1 | 4/2018 | Williams et al. | |
| 2018/0133583 | A1* | 5/2018 | Tran | G06F 3/00 |
| 2018/0236303 | A1 | 8/2018 | Mathar et al. | |
| 2018/0276430 | A1* | 9/2018 | Klinger | G06K 19/07758 |
| 2018/0374127 | A1* | 12/2018 | Walden | G06Q 30/0242 |
| 2019/0040738 | A1* | 2/2019 | Ramjit | E21B 47/26 |
| 2019/0102735 | A1* | 4/2019 | Barton | G06Q 10/0833 |
| 2019/0156647 | A1* | 5/2019 | Farooqui | G08B 19/00 |
| 2020/0025860 | A1* | 1/2020 | Ivanov | G01S 19/01 |
| 2020/0200858 | A1* | 6/2020 | Wirola | G01S 5/02527 |
| 2020/0205004 | A1* | 6/2020 | Wirola | H04W 4/029 |
| 2021/0033697 | A1* | 2/2021 | Vyunova | G01S 5/02527 |
| 2021/0063522 | A1* | 3/2021 | Rauhala | H04W 64/003 |
| 2023/0176226 | A1* | 6/2023 | Rauhala | G01S 5/02526 |
| | | | | 342/357.42 |
| 2024/0023230 | A1* | 1/2024 | Berthier | H05K 1/0243 |
| 2024/0145893 | A1* | 5/2024 | Lv | H01P 1/205 |

OTHER PUBLICATIONS

Suzhi Bi, "engineering Radio Maps for Wireless Resource Management", published by IEEE Wireless Communications in Apr. 2019, all pages (Year: 2019).*

*Creating Antennas and RFIDs with 3D Printing Technology*, Nano Dimension Blog, Aug. 29, 2019 (3 pages).

Farooqui et al., *3D-printed Disposable Wireless Sensors with Integrated Microelectronics for Large Area Environmental Monitoring*, Advanced Materials Technologies, published May 19, 2017.

Lu et al., *Additive Manufacturing Frontier: 3D Printing Electronics*, Opto-Electronic Advances, Review, 2018, vol. 1, No. 1 (10 pages).

Iyer, Vikram et al., *3D Printing Wireless Connected Objects*, ACM Transactions on Graphics, vol. 36, No. 6, Art 242, Published Nov. 2017 (13 pages).

Extended European Search Report for EP Application No. 19216045.5 dated Jul. 6, 2020 (9 pages).

Office Action for European Application No. 19216045.5 dated Mar. 6, 2024, 7 pages.

\* cited by examiner

PRINTABLE TRACKING DEVICE

CROSS-REFERENCE TO RELATED APPLICATIONS

This application claims priority to European Application No. 19216045.5, filed Dec. 13, 2019, the entire contents of which are incorporated herein by reference.

FIELD

The following disclosure relates to the field of positioning, or more particularly relates to apparatuses, and methods to produce printable tracking devices.

BACKGROUND

The number of devices with location capabilities is expected to grow exponentially in the next decade or so. This growth is the result of the Internet-of-Things (IoT) era, in which more and more devices get connected to the Internet. Soon homes, factories, cities and transportation means will be equipped with low-cost sensors that produce real-time information on various characteristics and environment variables. Moreover, cheaper electronics enable factories and industries to equip assets and supply or logistics chains with tracking devices that provide real-time information on the flow of goods.

The basics of IoT is that the sensor and tracking devices are location-aware. The location awareness can be achieved through two means: either the device has its own positioning capabilities (like GNSS (Global Navigation Satellite System) or cell/WiFi/Bluetooth offline positioning) or the device performs measurements of the radio environment (cell/WiFi/Bluetooth) and sends them to the cloud for position determination.

When it comes to small devices that must function autonomously for extended periods of time, power consumption is of special concern. The devices can be powered by batteries and, thus, any means to reduce current drain are welcome. The longer the devices run without maintenance (e.g. charging), the lower the operational costs are.

As far as location technologies are concerned, there are few ways to reduce power consumption. The greatest power saving results from using the correct technology at the correct time. To exemplify, when low location accuracy is adequate, it is advantageous to use cellular positioning because it is cheap in terms of energy.

Another key in power saving is the interval at which a location is estimated and reported to the cloud. When it comes to reporting, the key is to use as energy-efficient communication mechanism as possible. Various LPWAN (Low Power Wide Area Network) wireless communication systems have been deployed over the recent years to support low-power low-bandwidth data communications between IoT devices and cloud services.

Asset tracking can provide visibility to e.g. inbound/outbound logistics chains and provide tangible business benefits, e.g. when waste gets eliminated from those supply chains. Unfortunately, this business benefit is downplayed by the TCO (Total Cost of Ownership) related to managing a large fleet of tracking devices.

For instance, in a large fleet, e.g. 100,000 tracking devices or more, wherein the devices have a three-month battery life, on average, this means that a battery needs to be replaced/charged for 1,000 devices every single day.

Another hurdle is the rotation of the tracking devices. In a logistics operation where assets are e.g. shipped from location A to location B on the other side of the globe, and an asset arrives to the location B, the tracking devices needs to be detached from the asset and shipped back to the location A. The cost of this excess operation may be prohibitively large, in case the tracking device should be re-used.

Further, passive RFID (Radio Frequency IDentification) tags are known. Such passive RFID tags are low cost devices today so that they can be disposed. However, passive RFID tags provide only "gate level" tracking. This means that there are RFID readers e.g. at warehouse gates reading which assets respectively RFID tags come in and which go out. While this is cheap and simple, it does not provide visibility to the asset whereabouts itself, in particular during its transportation along a logistics chain from an origin location to a destination location.

SUMMARY OF SOME EXEMPLARY EMBODIMENTS

However, it is a drawback that the production and operation of such tracking devices is costly and cumbersome, or the tracking capabilities are limited.

It is thus, inter alia, an object of the invention to achieve a solution that drives the cost of a tracking device so low that the tracker may be disposed after an asset reaches a destination location and enables more accurate tracking of an asset. Further, the solution may achieve that such a tracking device can be attached to an asset in an automated fashion so that no delays in the logistics chain are caused, and optionally, no human interaction to attach and/or configure the tracking device is required.

According to a first exemplary aspect of the present invention, an apparatus is disclosed, the apparatus comprising:
  at least one antenna; and
  a carrier;
wherein the carrier comprises the at least one antenna, and wherein the at least one antenna is formed by printing the at least one antenna on or to the carrier;
  wherein the carrier is attachable to an asset to be tracked, wherein the apparatus is configured to enable determining of at least one position estimate indicative of a current position of the apparatus, and
  wherein the at least one position estimate is determined, at least in part, based on one or more signals observable by the at least one antenna.

One or more actions that may for instance be performed and/or controlled by the apparatus may be performed and/or controlled by using at least one processor of the apparatus. Additionally or alternatively, such one or more actions (e.g. determining of at least one position estimate) may for instance be performed by a module or a chip comprised by the apparatus.

The apparatus may for instance be an IoT device, a low-capability device, or a tracking device (also referred to as "tracker" within the meaning of the present invention).

According to a further exemplary aspect of the invention, a computer program is disclosed, the computer program when executed by a processor causing an apparatus, for instance the apparatus according to the first exemplary aspect of the present invention, to perform and/or control one or more actions (e.g. determining of at least one position estimate) that are performed and/or controlled by the apparatus according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, the apparatus is configured to perform and/or control or comprising respective means for performing and/or controlling the actions.

One or more of the means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, the apparatus comprises at least one processor and at least one memory including computer program code, the at least one memory and the computer program code configured to, with the at least one processor, cause an apparatus, for instance the apparatus, at least to perform and/or to control the method according to the first exemplary aspect.

According to a second exemplary aspect of the present invention, a method for producing an apparatus is proposed, in particular an apparatus according to the first exemplary aspect of the present invention, the method comprising:
providing a carrier;
printing at least antenna on or to the carrier;
wherein the at least one antenna is comprised by the carrier; and
providing attachable means to the carrier enabling the carrier to be attachable to an asset to be tracked.

According to a further exemplary aspect of the present invention, a use of an apparatus is proposed, in particular an apparatus according to the first exemplary aspect of the present invention, to determine at least one position estimate indicative of a current position of the apparatus.

In the following, exemplary features and exemplary embodiments of all aspects of the present invention will be described in further detail.

The apparatus may for instance be configured to enable active tracking of an (e.g. transportable) asset to be tracked. Thus, the apparatus may not be limited to only enable "gate" level type tracking, as enabled by RFID tags.

The term "active tracking" as used herein, in particular refers to the apparatus comprising at least one energy storage (e.g. a battery) enabling one or more components of the apparatus to be powered. This can enable the apparatus to determine at least one position estimate on any location throughout a logistics chain. In contrast, a known RFID tag does not need to have at least one energy storage, thus, no components of the RFID tag need to be powered. Such RFID tags may be referred to as enabling "passive tracking".

The apparatus may for instance be integrated in a packaging of the asset to be tracked, or in a shipping label that may be attached to a packaging, e.g. made out of cardboard, to name but one non-limiting example.

The apparatus is configured to enable active tracking of an asset to be tracked, e.g. along a logistics chain. The apparatus is configured to determine at least one position estimate. In this way, example embodiments enable that dependent upon the frequency of the apparatus performing and/or controlling the determining of at least one position estimate, it may be known where the asset to be tracked is at all times. Further, the apparatus is configured to receive a request so that the determining of the at least one position estimate may be triggered.

The carrier may for instance be a substrate configured to be provided with the at least one antenna and/or the at least one energy storage. It may for instance be enabled to print (e.g. 3D print) at least one antenna and/or the at least one energy storage to the carrier. The carrier may for instance comprise, at least in part, paper, or cardboard, or the carrier may be paper or cardboard, enabling that the apparatus may be a part of a shipping label, or packaging, or a parcel or delivery box of the asset. The carrier may alternatively be configured to be attached to paper, or cardboard enabling that the apparatus may be a part of a shipping label, or packaging, or a parcel or delivery box by attaching (e.g. gluing) the apparatus to the paper, or cardboard of the shipping label, or packaging, or parcel or delivery box. The carrier may be a substrate comprising e.g. a polymer, polymer nanocomposites or the like (to name but a few non-limiting examples), which can be printed (itself) and on or to which one or more (e.g. conductive) elements may be printed (e.g. 3D printed). For instance, the substrate may enclose the one or more (e.g. conductive) elements. The substrate and the one or more conductive elements may for instance be printed separately, and are combined so that the carrier comprises the at least one antenna and/or the at least one energy storage. In this way, the carrier is attachable to an asset to be tracked.

The at least one antenna may for instance be formed by printing the at least one antenna to the carrier.

The asset to be tracked may for instance be a transportable asset. The asset may for instance be a physical product, e.g. an item or items, a good or goods, or an asset or assets, to be transported. The asset may for instance be transported along a logistics chain (e.g. inbound or outbound logistics chain), e.g. wherein one or more different transportation vehicle (e.g.) may be used. The term "logistics chain" refers to the asset being transported from an origin location to its intended destination location. The asset may for instance be packaged in a parcel or delivery box, a packet, a package, a container, or the like to name but a few non-limiting examples.

The transportation vehicle may for instance be a vehicle, e.g. a car or a truck respectively a lorry, or a motorbike, or a freighter or any other suitable vehicle, or a bike or a person that carries the respective asset, a cargo ship, or an air cargo plane, to name but a few non-limiting examples.

According to an exemplary embodiment of all aspects of the present invention, the apparatus (e.g. a tracking device) is for one-time use. The apparatus may for instance be disposable. The materials used for manufacturing the apparatus may for instance be recyclable.

The apparatus is configured to enable determining of at least one position estimate indicative of a current position of the apparatus. The at least one position estimate is determined, at least in part, based on one or more signals observable by the at least one antenna. The one or more signals may for instance be radio signals. The one or more signals may for instance be sent by one or more radio nodes of non-cellular communication networks (e.g. WLAN (Wireless Local Area Network) access points, and/or BT (Bluetooth) and/or BLE (BT Low Energy beacon devices) or LPWAN access points, or by one or more entities of a cellular communication network (e.g. one or more base stations according to LTE (Long-Term Evolution), LTE-A (LTE-Advanced), 5G, 6G, or NR (New Radio) communication standard, or further future communication standard), to name but a few non-limiting examples.

Certain signals of the one or more signals may be observable at a certain location. The one or more signals may for instance be observable by one or more measurements performed by the apparatus. For instance, by determining which signals are currently observable, an estimation of the current position of the apparatus may be performed.

The apparatus may for instance have GNSS-capability. A user tracking such a transportable asset may further benefit in case the apparatus has in addition or in alternative to a GNSS-capability a capability to use non-GNSS-based positioning system(s)/technology, such as cellular/non-cellular positioning system(s)/technologies, e.g. in terms of time-to-first-fix and power consumption. Also, not all applications require highly accurate GNSS-based position (e.g. in situation(s) or location(s) where an accurate position estimate cannot be determined, it might be sufficient to use cell-based position estimate enabling at least an area in which the transportable asset is located to be determined). Also, cellular/non-cellular positioning system(s)/technologies work indoors and in urban canyons, which are generally challenging environments for GNSS-based technologies.

The at least one position estimate may for instance be determined based on (a) positioning system(s)/technology. The positioning system(s)/technology may enable two different modes for determining the at least one position estimate. The first mode is a terminal-assisted mode, in which the apparatus (e.g. as a tracking device) performs the measurements of the cellular and/or non-cellular air interface, and provides the measurements to a remote server or server cloud, which in turn provides the position estimate back to the apparatus. In this case, the apparatus determines the at least one position estimate, e.g. by a request sent to the remote server or server cloud and receiving the at least one position estimate. The request may for instance comprise the measurements, enabling the remote server or server cloud to determine (e.g. estimate) the at least one position estimate.

The second mode is the terminal-based mode, in which the apparatus has a local copy of a radio map (or most likely, a subset of a global radio map).

Such a radio map may be configured to enable devices, such as the apparatus, to estimate their position at least partially based on this radio map when the apparatus is located in the area covered by the radio map. For example, the radio map is represented by radio map information which may be provided (e.g. transmitted) by a positioning server (e.g. the remote server or server cloud disclosed above) to the apparatus and/or which may be hold available by the apparatus (e.g. stored in memory means of the apparatus). For example, the radio map contains or represents a respective radio model for a plurality of radio nodes transmitting (e.g. broadcasting) radio signals that are observable within the area covered by the radio map. If the radio map covers an area (e.g. geographic area), the radio map may further contain or represent, e.g. for a height within the area, a respective radio model for a plurality of radio nodes transmitting (e.g. broadcasting) radio signals that are observable.

Such radio signals may be terrestrial radio signals. Examples of such a terrestrial radio signal are a BT signal, a BLE signal, a cellular network signal, a WLAN signal, and/or a LPWAN signal. The BT standards are specified by the Bluetooth Special Interest Group and are presently available under https://www.bluetooth.com/. A cellular network may for example be mobile phone network like a 2G/3G/4G/5G/6G/NR (New Radio) cellular communication network. The 2G/3G/4G/5G/6G/NR or future cellular radio communication standards are developed by the 3GPP and presently available under http://www.3gpp.org/. WLAN is for example specified by the standards of the IEEE 802.11 family (http://www.ieee.org/). For instance, LORAN (Long Range Navigation), in particular used by ships and/or aircrafts, is a positioning system/technology utilizing, at least in part, one or more LPWAN signals.

Such (a) radio node(s), e.g. according to BT- and/or BLE-specification, or may for instance be a Wi-Fi Access Point for positioning, e.g. according to the WLAN- and/or LPWAN-specification, may for instance be used for determining the at least one position estimate, e.g. by (a) positioning system(s)/technology.

Such (a) radio node(s), e.g. located within a certain area, may for instance comprise or be connectable to a transceiver, e.g. according to the BT-, BLE, and/or WLAN, and/or LPWAN-specification to provide wireless-based communication. Each radio node of the one or more radio nodes may for instance use such a transceiver for transmitting and/or broadcasting one or more radio signals, e.g. comprising or containing one or more information and/or potentially manipulated radio signals and/or radio signal parameters.

Such a subset of a radio map or a global radio map may for instance be received (e.g. downloaded) by the apparatus, e.g. from a remote server for a(n) (geographic) area of interest (e.g. an area around the current location, or for a whole country, or an area comprising the area traveled by the intended logistics chain, to name but a few non-limiting examples) out of a global radio map comprised a plurality of such subsets. Such a subset can further be pre-installed to the apparatus during the manufacturing (e.g. according to the method of the second exemplary aspect of the present invention), but even in that case the data comprising the (global) radio map may be needed to be refreshed at some point.

For instance, for resolving location indoors (e.g. in a supply chain of a manufacturing venue), it may be relied on fusion of GNSS (e.g. GPS (Global Positioning System), GALILEO, GLONASS (Globalnaja nawigazionnaja sputnikowaja sistema), to name but a few non-limiting examples) and sensor data. These solutions extend position estimation to GNSS-denied areas based on the sensor data. Other approaches rely on probes collected outdoors, in order to localize probes located indoors (probes collected outdoors and indoors contain same WiFi access point(s) and can, thus, be related to each other).

The at least one position estimate may for instance be a coarse position estimate. The at least one position estimate of the apparatus may for example indicate a pre-determined area covering the (e.g. absolute) position of the apparatus, but may not indicate the specific, thus more accurate, (e.g. absolute) position of the apparatus. The GNSS-based and/or the non-GNSS-based positioning may for instance use one or more measurements of radio signals or radio signal parameters to be considered. Each of those measurements may for instance be considered to be indicative of whether or not the apparatus is located in the vicinity of or within an area where the respective radio signals and/or radio signal parameters were gathered (e.g. measured or captured) as a part of the determining of the at least one position estimate. For example, the apparatus may be considered to be in the vicinity of or within an area, if the respective radio signals and/or radio signal parameters represented by the one or more measurements indicate a pre-determined area and/or venue.

The apparatus may for instance comprise one or more components, e.g. the at least one antenna that is formed on or to the carrier, e.g. by (e.g. 3D) printing. It will be understood that one or more further components of the apparatus may for instance be formed to the carrier as well, e.g. by 3D printing. For instance, one or more radios may for instance be (e.g. 3D) printed to the carrier by leveraging e.g. Wi-Fi backscatter. Such Wi-Fi backscatter is a low-power wireless communication in which a device (e.g. the apparatus comprising the one or more radios) communicates information by modulating its reflection of an incident Wi-Fi signal. To print respectively 3D print the Wi-Fi backscatter physically, for instance composite plastic filament materials comprising conductive properties may for instance be used respectively utilized, to name but one non-limiting examples. Such materials may for instance be plastic comprising one or more copper and/or graphene fillings. Such one or more copper and/or graphene fillings may have RF (Radio Frequency) attributes and/or properties associated with it. In this way, the at least one antenna comprising one or more copper and/or graphene fillings may for instance be formed by printing (e.g. 3D printing) these filaments on or to the carrier. Other one or more components comprised by the apparatus may be formed on or to the carrier in the same way, to name but one non-limiting example.

The carrier may for instance enclose the at least one antenna. For instance, the at least one antenna is formed similar to a circuit board, wherein e.g. one or more copper elements to name but one non-limiting example, are printed on a first layer of the carrier. Then, e.g. another layer of the carrier, e.g. of the same material as the first layer, may for instance be printed on top of the first layer so that the at least one antenna is enclosed by the carrier. For instance, the carrier may be printed (e.g. 3D printed) as well, e.g. by a 3D inkjet printing. The at least one antenna may for instance be printed by a 3D copper printing. This combination may for instance enable a low-cost, fully integrated apparatus, e.g. a tracking device.

For instance, the carrier may for instance be formed by using a stereolithography. Further, e.g. one or more components, e.g. the at least one antenna, the at least one integrated circuit, the at least one interface, or a combination thereof, may for instance be formed by using a direct print. Such a direct print may for instance enable one or more interconnections to be printed by the direct print enabling to print one or more conductive inks. Further, the carrier, the at least one antenna, the at least one integrated circuit, the at least one interface, or a combination thereof, may for instance be formed by a hybrid 3D printing process respectively technology combining direct-write/cure (DWC) and projection microstereolithography (PμSL) enabling to print such 3D structural electronics to be comprised by the apparatus.

Further, one or more components, e.g. the at least one antenna, at least one integrated circuit, the at least one energy storage (e.g. a battery), the memory, the at least one interface, or a combination thereof of the apparatus may for instance be printed by a combination of ink jet, aerosol jet and/or extrusion print heads, to name but one further non-limiting example. Thus, in the same or similar way as disclosed above. For instance, the deposited material may be one or more conjugated polymers that can be utilizable. Further, one or more solvents may be utilized by the (e.g. 3D) printing, to name but a few non-limiting examples. In this way, a wide range of materials being usable or utilizable for (e.g. 3D) printing of at least a part of the apparatus is enabled.

According to an exemplary embodiment of all aspects of the present invention, the apparatus further comprises:
at least one energy storage; and/or
at least one interface for connection with at least one integrated circuit, and
at least one integrated circuit comprising at least one processor and at least one memory including computer program code, the at least one memory and the computer program code configured to, with the at least one processor, cause the apparatus to at least perform the determining of the at least one position,
wherein the at least one integrated circuit is electrically coupled to the at least one interface.

The apparatus may for instance comprise at least one interface for connection with at least one integrated circuit in case such at least one integrated circuit may be required to be mounted to the apparatus, e.g. later and/or by a (e.g. third) party that is different from the manufacturer, to name but one non-limiting example. In this case, the at least one interface may for instance be formed on or to the carrier, e.g. by (e.g. 3D) printing the at least one interface to the carrier. The at least one integrated circuit may be electrically coupled to the at least one interface, e.g. by mounting the at least one integrated circuit (e.g. embodied as a component, chip or module) to the carrier.

The apparatus may for instance comprise the at least one integrated circuit by being a part of or being comprised by the apparatus. In this case, e.g. such at least one integrated circuit may be formed on or to the carrier, e.g. by (e.g. 3D) printing the at least one integrated circuit to the carrier.

The at least one interface may e.g. enable connection between one or more components of the apparatus, e.g. between the at least one antenna and the at least one integrated circuit.

According to an exemplary embodiment of all aspects of the present invention, the at least one memory and the computer program code configured to, with the at least one processor, cause the apparatus further to perform:
providing the (e.g. determined) at least one position estimate.

The at least one determined position estimate may for instance be provided, e.g. by outputting the at least one determined position estimate. The at least one position estimate may be output e.g. to an entity, e.g. which may be pre-defined, or to another entity that is different from the apparatus. The at least one position estimate may for instance be output via a communication interface(s) of the apparatus according to the first exemplary aspect of the present invention. The provided at least one position estimate may enable a (e.g. third) party (e.g. a user) to get information about the whereabouts of one or more assets.

According to an exemplary embodiment of all aspects of the present invention, the carrier is or is a part of one of following:
a shipping label attached to the asset to be tracked;
a cardboard comprised by the asset to be tracked;
a packaging of the asset to be tracked; or
the asset to be tracked.

The carrier may for instance be attachable to an asset to be tracked. Alternatively, the apparatus comprising the carrier may for instance be a part of an asset to be tracked, e.g. directly be comprised by or included in the asset to be tracked.

The carrier may for instance be attached (e.g. glued) to the packaging of the asset to be tracked. The carrier may for instance be represented by a shipping label, e.g. a paper shipping label. The carrier may for instance be attached to the asset by gluing the shipping label comprising means to attach the apparatus, or at least the carrier to the packaging of the asset, or to the asset. The packaging of the asset may be, at least in part, comprise a cardboard. The carrier may for instance comprise an attaching section respectively layer, e.g. a surface of the carrier that can be brought in contact to the asset, or the packaging of the asset, to enable the apparatus, or at least the carrier of the apparatus to be attached (e.g. glued) to the asset, or the packaging of the asset by the attaching section respectively layer. The attaching section respectively layer may for instance comprise or be made of adhesive tape, to name but one non-limiting example.

According to an exemplary embodiment of all aspects of the present invention, the carrier is removable from the asset to be tracked. In case the carrier comprises an attaching section respectively layer, the carrier may for instance be arrangeable (e.g. glueable) to the asset respectively a packaging of the asset. The carrier may for instance be detachable from the asset respective a packaging of the asset. The carrier may for instance be arranged to the asset or a packaging of the asset by mounting the apparatus, e.g. after its manufacturing is finished, to the asset or the packaging of the asset. The carrier may for instance be attached to the asset or a packaging of the asset by (e.g. directly) printing (e.g. 3D printing) the apparatus, e.g. during its manufacturing, to the asset or the packaging of the asset.

According to an exemplary embodiment of all aspects of the present invention, one or more of the at least one energy storage, the at least one interface, and the at least one integrated circuit are printed on or to the carrier. In particular, the at least one energy storage, the at least one interface, and the at least one integrated circuit may for instance be printed on or to the carrier by a (e.g. 3D) printing process, as disclosed above.

The at least one energy storage, the at least one interface, the at least one integrated circuit, or a combination thereof may for instance represent one or more components of the apparatus.

Thus, the apparatus may for instance comprise the one or more components, e.g. the at least one antenna that is formed on or to the carrier, e.g. by a 3D printing process. It will be understood that one or more further components of the apparatus may for instance be formed to the carrier as well, e.g. by a same or different 3D printing process.

According to an exemplary embodiment of all aspects of the present invention, the apparatus is an Internet-of-Things device, or a low-capability device, or a tracking device (also referred to as tracker).

In case the apparatus is a tracking device, the apparatus may for instance take the form and/or function of an active tracking, as disclosed above.

The apparatus may in particular be a battery-powered device. The apparatus may in particular be a battery-powered device with location awareness by being configured to enable active tracking.

According to an exemplary embodiment of the second exemplary aspect of the present invention, the method for producing the apparatus is proposed to provide a carrier. The carrier may for instance be a paper, such as comprised by a shipping label, or a cardboard. Additionally or alternatively, the carrier may for instance be printed. In this latter case, the carrier may for instance be printed from scratch. In the other cases, the carrier (e.g. a paper or cardboard, a substrate, or a combination thereof) is provided, e.g. to a 3D printing process device (e.g. a 3D printer, as disclosed above).

The 3D printing process device may for instance print the at least antenna on or to the (provided) carrier. The at least one antenna may for instance be printed after the carrier is printed, in case the carrier may be printed, e.g. by a 3D printing process, as well.

Then, attachable means, e.g. an attaching section respectively layer, is provided on or to the carrier. For instance, such attachable means may for instance be represented by adhesive or adhesive tape. Adhesive tape may for instance be provided on or to the carrier by mounting (e.g. gluing) the adhesive tape on or to a respective attaching section respectively layer of the carrier. The adhesive respectively adhesive tape may for instance enable a substance-locking connection. Alternatively or additionally, the attachable means may for instance enable a frictional connection (e.g. the attachable means being e.g. cable ties or the like), or an interlocking connection (e.g. the apparatus may for instance be inserted into a mounting section having a form corresponding to the apparatus or the attaching section of the carrier), to name but a few non-limiting examples.

Some or all of the components may for instance be formed to be comprised by the carrier by a 3D printing process, e.g. as disclosed above. For instance, the apparatus manufactured according to the method of the second exemplary aspect of the present invention may for instance comprise the at least one antenna that is formed by a 3D printing process. In alternative embodiments according to all aspects of the present invention, additionally the at least one energy storage, the at least one interface may for instance be formed on or to the carrier by such a 3D printing process. One or more of the components comprised by the apparatus according to the first exemplary aspect of the present invention may for instance be formed by such a 3D printing process. Further, one or more components of the apparatus may for instance be embedded in the apparatus, e.g. by mounting the respective components to the carrier of the apparatus, wherein such respective components may be electrically coupled (e.g. connected) to one or more further components of the apparatus via the at least one interface.

According to an exemplary embodiment of all aspects of the present invention, the method further comprises:
  printing at least one energy storage on or to the carrier; and/or
  printing at least one interface on or to the carrier, wherein the at least one interface is configured for a connection with at least one integrated circuit; and
  electrically coupling at least one integrated circuit to the at least one interface.

The printing of the at least one energy storage and/or of the at least one interface on or to the carrier may for instance be performed and/or controlled by a 3D printing process, e.g. as disclosed above. The at least one energy storage and/or of the at least one interface may for instance be electrically coupled, e.g. by forming one or more conductive tracks on or to the carrier connecting the at least one energy storage and/or of the at least one interface and/or the at least one antenna with each other.

The at least one integrated circuit may for instance be attached respective mounted to the carrier, e.g. soldering the at least one integrated circuit to the at least one interface. Since the at least one interface comprises electrical connections (e.g. conductive tracks that may for instance be printed (e.g. by a respective 3D printing process) on or to the carrier) with e.g. the at least one antenna, the at least one energy storage, the at least one integrated circuit is electrically coupled to the at least one antenna, the at least one energy storage, and/or optionally to one or more further components of the apparatus. In this way, the at least one integrated circuit, e.g. comprising at least one processor and at least one memory including computer program code, the at least one memory and the computer program code configured to, with the at least one processor, may cause the apparatus to at least perform the determining of the at least one position estimate.

According to an exemplary embodiment of all aspects of the present invention, the at least one integrated circuit comprises at least one processor and at least one memory including computer program code, the at least one memory and the computer program code configured to, with the at least one processor, cause the apparatus to at least perform the determining of the at least one position estimate.

The determining of the at least one position estimate may for instance utilize some or all of the components of the apparatus.

According to an exemplary embodiment of all aspects of the present invention, the method further comprises:
  printing at least one integrated circuit on or to the carrier.

In case the at least one integrated circuit is not attached to the carrier, since e.g. the at least one integrated circuit is not a separate component, module or chip, the at least one integrated circuit may be printed on or to the carrier. The at least one integrated circuit may for instance be printed on or to the carrier by a 3D printing process.

According to an exemplary embodiment of all aspects of the present invention, the at least one integrated circuit comprises at least one processor and at least one memory including computer program code, the at least one memory and the computer program code configured to, with the at least one processor, cause the apparatus to at least perform the determining of the at least one position estimate.

According to an exemplary embodiment of all aspects of the present invention, the method further comprises:
  attaching the carrier to an asset to be tracked.

The apparatus that is manufactured according to the method of the second exemplary aspect of the present invention may comprise attachable means, e.g. an attaching section respectively layer, on the carrier. For instance, such attachable means may for instance be represented by adhesive or adhesive tape. The adhesive tape may for instance be attached to the asset so that the carrier can be attached to the asset. The adhesive tape may for instance glue the carrier to the asset. The attaching (e.g. adhesive) means or the adhesive tape may be provided on or to the carrier by mounting the attaching means on or to a respective attaching section respectively layer of the carrier.

According to an exemplary embodiment of all aspects of the present invention, the carrier is a part of an asset to be tracked. The apparatus manufactured according to the method of the second exemplary aspect of the present invention may for instance be manufactured directly on or to the asset. For instance, the carrier may be a part of the asset so that e.g. the at least one antenna, e.g. as one example of one or more components of the apparatus, may for instance be directly printed to the carrier being a part of the asset, to name but one non-limiting example.

The apparatus according to the first exemplary aspect of the present invention, optionally being manufactured according to the method of the second exemplary aspect of the present invention, may for instance be used to determine at least one position estimate indicative of a current position of the apparatus. The apparatus may for instance be used to determine the at least one position estimate during the transportation of an asset (to be tracked) along a logistics chain. The asset may for instance be transported along the logistics chain to be transported from an origin location (e.g. a manufacturing facility of the asset) to an intended destination location (e.g. a customer of the asset).

According to an exemplary embodiment of all aspects of the present invention, the use of the apparatus according to the first exemplary aspect of the present invention, optionally being manufactured according to the method of the second exemplary aspect of the present invention is further to provide the at least one position estimate.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
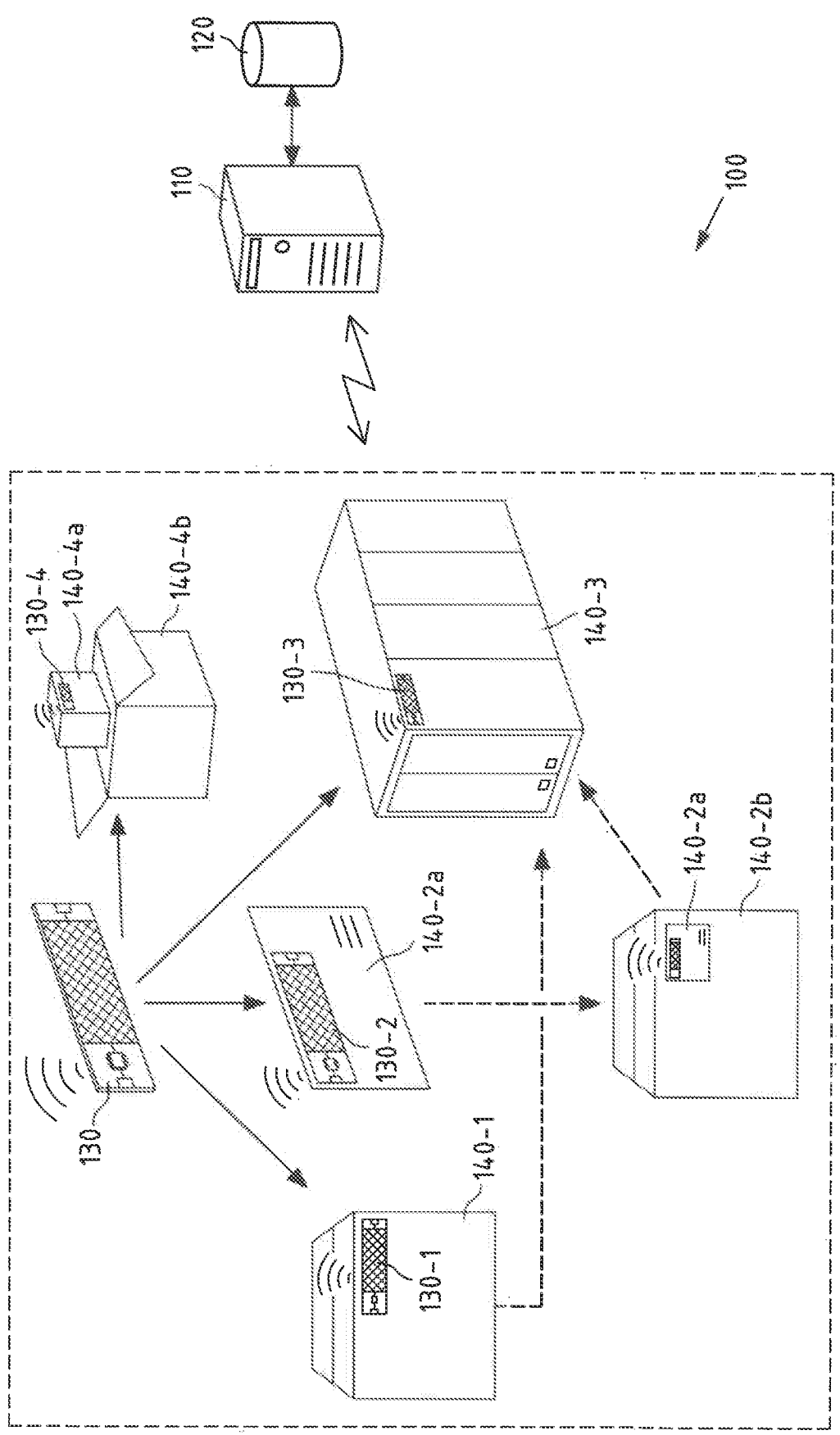
FIG. 1 a schematic block diagram of example embodiments of an apparatus according to the first exemplary aspect of the present invention, shown in a system according to all exemplary aspects of the present invention.

FIG. 1 is a schematic high-level block diagram of example embodiments of the present invention. One or more of the entities shown in FIG. 1 may for instance be comprised by a system 100. Such a system 100 may for instance be configured as a generic architecture enabling one or more of the apparatuses according to the first exemplary aspect of the present invention to determine at least one position estimate. Such at least one position estimate may for instance be indicative of a current location of the respective apparatus that has determined the at least one position estimate.

The system 100 may for instance comprise one or more apparatus(es) 130, and 130-1 to 130-4 (e.g. an IoT device, a low-capability device, or a tracking device (e.g. a tracker).

In FIG. 1, it is indicated by the arrows that an apparatus 130 representing an apparatus according to the first exemplary aspect of the present invention, may be attached or printed to another entity. Thus, apparatus 130 when being attached to a parcel or delivery box is referred to as apparatus 130-1 130-2, 130-3, or 130-4. Further, system 100 may for instance comprise a server 110, and an optional database 120, e.g. for storing one or more position estimates, and/or one or more pieces of radio map data, e.g. enabling apparatus(es) 130, 130-1 to 130-4 to determine at least one position estimate, e.g. in a terminal-assisted mode. In case the respective apparatus(es) 130, 130-1 to 130-4 may for instance determine at least one position estimate, e.g. in a terminal-based mode, e.g. server 110 may for instance provide one or more pieces of radio map data to the respective apparatus(es) 130, 130-1 to 130-4 prior to the apparatus(es) 130, 130-1 to 130-4 determining the at least one position estimate.

Communication between the apparatus(es) 130, 130-1 to 130-4 and the server 110 may for instance be performed in a wireless fashion, e.g. via a cellular and/or non-cellular (e.g. WLAN, WAN, LPWAN or the like) communication network, e.g. via the Internet.

The apparatus(es) 130, 130-1 to 130-4 comprise at least one antenna; and a carrier; wherein the carrier comprises the at least one antenna, and wherein the at least one antenna is formed by printing the at least one antenna on or to the carrier; wherein the carrier is attachable to an asset to be tracked, wherein the apparatus is configured to enable determining of at least one position estimate indicative of a current position of the apparatus, and wherein the at least one position estimate is determined, at least in part, based on one or more signals observable by the at least one antenna. The apparatus(es) 130, 130-1 to 130-4 may for instance be represented by apparatus 230 of FIG. 2, and/or apparatus 300 of FIG. 3.

The apparatus(es) 130, 130-1 to 130-4 may for instance be printable. One or more components (see also description of FIG. 2 and FIG. 3 of respective apparatuses 230 and 300) may for instance be printed so that they can be attached to an asset to be tracked, and/or to a packaging of an asset to be tracked. The asset may for instance be tracked along its logistics chain, e.g. from an origin or source location to a(n) (intended) destination location. The asset to be tracked may for instance be transportable.

The apparatus(es) 130, 130-1 to 130-4 may for instance be a printed (e.g. 3D printed) tracking device. This enables that the apparatus(es) 130, 130-1 to 130-4 may for instance be printed to a parcel or delivery box, e.g. see the parcel or delivery box 140-1. The apparatus(es) 130, 130-1 to 130-4 may for instance directly be printed to the parcel or delivery box 140-1, e.g. on a cardboard of the parcel or delivery box, to name but one non-limiting example. In FIG. 1, apparatus 130-1 is printed to the parcel or delivery box 140-1. This is indicated in FIG. 1 by the apparatus 130 being shown on top of the parcel or delivery box 140-1.

The apparatus(es) 130, 130-1 to 130-4 is intended for a one-time use. Thus, e.g. after an asset to be tracked by the apparatus 130-1 to 130-4 has reached its destination, e.g. a customer that received e.g. the parcel or delivery box 140-1 comprising the apparatus 130-1, the asset may for instance be unboxed out of the parcel or delivery box 140-1 and the parcel or delivery box 140-1 can be disposed. The apparatus(es) 130, and/or 130-1 to 130-4 may for instance be recyclable.

Alternatively, the apparatus(es) 130, 130-1 to 130-4 may for instance be printed to a shipping label, e.g. shown by apparatus 130-2 being comprised by the shipping label 140-2a. The shipping label may for instance comprise means for attaching the shipping label 140-2a to a parcel or delivery box, e.g. parcel or delivery box 140-2b comprising the shipping label 140-2a. For instance, the apparatus 130-2 may for instance directly be printed to the shipping label 140-2a.

The parcel or delivery box 140-1, and/or 140-2b may for instance be loaded into a container along their respective logistics chain, e.g. into container 140-3. Additionally or alternatively, a respective apparatus 130-3 may for instance be printed to the container 140-3 so that it is enabled to track e.g. the position of the container 140-3 along its logistics chain.

Further, a respective apparatus 130-4 may for instance be printed (e.g. directly) to an asset to be tracked, e.g. asset 140-4a to be tracked. As is indicated in FIG. 1, the asset 140-4a to be tracked may for instance be loaded into a packaging, e.g. as shown by packaging 140-4b. It will be understood that a respective apparatus 130-4 may for instance be additionally be printed to the packaging 140-4b as well, e.g. in case more than one (e.g. at least two, or a plurality of) assets to be tracked are loaded into a single packaging 140-4b.

Figure 2:
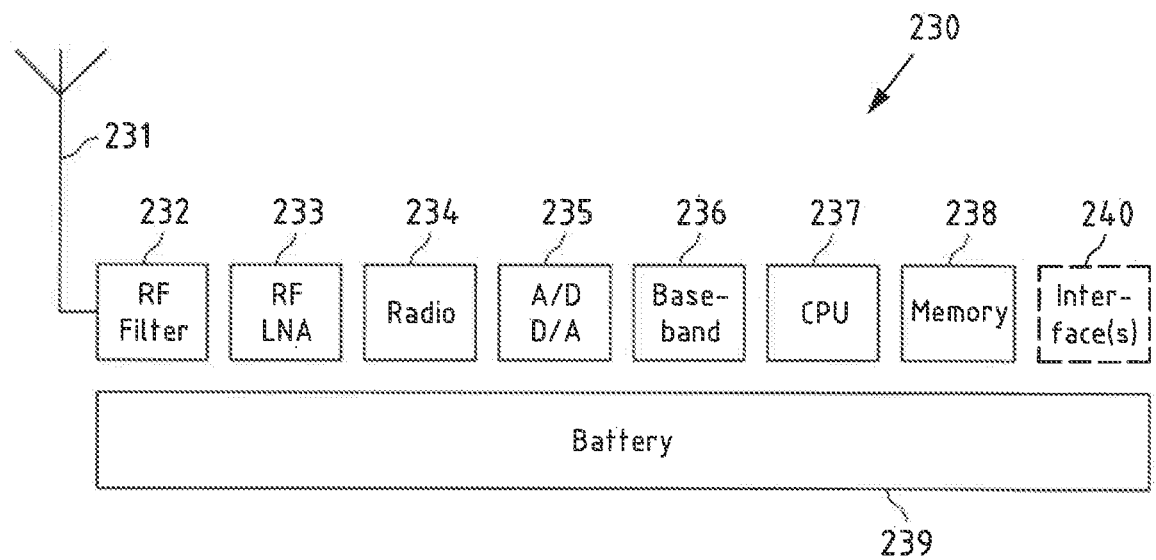
FIG. 2 a schematic block diagram showing an example embodiment of an apparatus according to the first exemplary aspect of the present invention.

FIG. 2 is a schematic block diagram showing an example embodiment of an apparatus 230 according to the first exemplary aspect of the present invention.

The schematic block diagram of the apparatus 230 according to an exemplary aspect of the present invention may for instance represent an IoT-device, a low-capability device, or a tracking device. For instance, the apparatus 230 may represent the apparatus 130, 130-1, 130-2, 130-3, 130-4 of FIG. 1.

In the FIG. 2, it is illustrated an example embodiment of a generic structure of a tracking device (e.g. a tracker) of all exemplary aspects of the present invention. In principle, one or more of the following components may be comprised by such a tracking device (e.g. apparatus 230 of FIG. 2, and/or apparatus 300 of FIG. 3):

antenna 231;
RF (Radio Frequency) filter 232;
radio 234 for connectivity & positioning (one or multiple radios e.g. cellular modem, WiFi, GNSS, or a combination thereof, to name but a few non-limiting examples);
RF LNA (Low Noise Amplifier) 233;
A/D (Analogue to Digital) and/or D/A (Digital to Analogue) converter 235;
baseband processor 236, e.g. as a part of communication interface(s);
the at least one integrated circuitry 237 or an integrated circuit 237 such as a CPU/ASIC/FPGA for processing;
memory 238 e.g. to store the firmware;
battery 239; and/or
optional interface(s) 240.

One or more of the above listed components may for instance be printed (e.g. 3D printed, as disclosed in the summary section of this specification. One or more of the above listed components may for instance be part of, thus being integrated to, the apparatus 230. In case a respective component or one or more respective components listed above are not a part of the apparatus 230, the apparatus 230 may for instance comprise a respective interface configured to be electrically connected (e.g. coupled) to a respective (external) component. In this way, the apparatus 230 may for instance comprise all of the above listed components.

For instance, the antenna 231, the RF filter 232 and the battery 239 may for instance be printed. Optionally, the memory 238 may also be printed. The antenna 231, the RF filter 232, the battery 239 and/or the memory 238 may for instance be printed in such a way that they form an integral part of the apparatus 230. To enable such a apparatus 230 to comprise the RF LNA 233, the radio 234, the A/D and/or D/A converter 235, baseband 236, integrated circuit 237, or a combination thereof, the apparatus 230 may for instance comprise at least one interface 240 enabling the RF LNA 233, the radio 234, the A/D and/or D/A converter 235, baseband 236, integrated circuit 237, or a combination thereof to be electrically connected to the at least one interface 240. The apparatus 230 may for instance comprise a single interface 240 for a single one entity of the RF LNA 233, the radio 234, the A/D and/or D/A converter 235, baseband 236, integrated circuit 237, or the apparatus 230 may for instance comprise one interface configured to be electrically connected to more than one (e.g. at least two) of the RF LNA 233, the radio 234, the A/D and/or D/A converter 235, baseband 236, and/or the integrated circuit 237.

The battery 239 may for instance be a printed Li-Ion battery e.g. with solid-state electrolyte, to name but one non-limiting example. There are various battery types that can be (e.g. 3D) printed. The battery 239 may be designed to last so that the battery life is suitable for the (e.g. typical) use cases of the apparatus 230. Such typical use cases may for instance be a tracking of a transportable asset along a logistics chain, e.g. tracking the transportable asset at least a single time from an origin location to its intended destination location. For instance, the apparatus 230 may for instance be configured to track an asset from a manufacturer to a respective customer of the manufactured product, to name but one non-limiting example.

The antenna 231 may for instance be a printed antenna. Various types of antennas may for instance be printed. For instance, the antenna 231 may be a WiFi, cellular and/or GNSS antenna. Thus, the apparatus 230 may for instance comprise more than one (e.g. at least two) antennas, e.g. more than of the aforementioned antennas.

The RF filter 232 may for instance be a printed RF filter. Such a RF filter may for instance pass through only the designed frequency band, e.g. enabling the apparatus 230 to reduce the total noise. For instance, one or more (e.g. radio) signals that are observable by the antenna 231 may for instance be filtered by the (e.g. printed) RF filter 232 so that a RF frontend may only pass signals with reduced or filtered noise out of the observed one or more signals to one or more further components (e.g. components 233 to 239 of the apparatus 230). In this way, e.g. further processing of the one or more signals is based on such filtered one or more signals.

The memory 238 may for instance be a printed memory. The memory 238 may for instance be a small-capability memory. Printing of such a memory 238 respective memory block may for instance be performed in such a way so that the apparatus 230 is configured e.g. that the memory 238 has enough capacity to hold e.g. a firmware of the apparatus 230.

The at least one integrated circuit 237 may for instance be a printed integrated circuit. Alternatively, the integrated circuit 237 may for instance be a module (e.g. a chip) that is electrically connectable (e.g. coupleable) to the interface(s) 240 of the apparatus 230. The at least one integrated circuit 237 may for instance be a CPU, an ASIC, a FPGA, or a combination thereof, to name but a few non-limiting examples.

The RF LNA 233, the A/D and/or D/A converter 235, the radio 234, the baseband 236 may for instance be a part of or comprised by the at least one circuit 237. Further, the at least one integrated circuit may for instance comprise at least a processing unit such as a CPU, an ASIC, and/or a FPGA.

Since the at least one integrated circuit may comprise a plurality of the semiconductors (transistors), in order to enable the apparatus 230 to comprise such at least one integrated circuit as a (e.g. 3D) printed at least one integrated circuit, during manufacturing it may be ensured that a printing device with a high enough resolution is utilized. The high enough resolution may for instance be required to enable achieving a transistor density suitable for the processing required by the apparatus 230, e.g. determining at least one position estimate, (e.g. high) performing baseband and CPU, ASIC, and/or FPGA. Further, such a high transistor density may also be preferred to push power consumption of the apparatus 230 down. This may also enable that a battery 239 with a quite low energy capacity can be used.

Additionally or alternatively, a hybrid 3D printing process respectively technology may for instance be utilized to manufacture the apparatus 230. For instance, direct-wire/cure technology and projection microstereolithography, or similar technologies, may for instance be utilized to make the apparatus 230 comprising such a (e.g. 3D) printed at least one integrated circuit 237. For instance, projection microstereolithography may be used to make a 3D structural part of the apparatus 230, e.g. a carrier, and produce e.g. conductive tracks and/or semiconductors by the direct-wire/cure technology. Further, the direct-wire/cure technology may for instance use CNT (Carbon Nanotubes) and/or polymer nanocomposites to enhance inexpensive printing of the apparatus 230, to name but a few non-limiting example.

The apparatus 230 may for instance require the antenna 231, the RF filter 232, the radio 234, the RF LNA 233, the A/D and/or D/A converter 235, the baseband (processor) 236, the at least one integrated circuitry 237 (e.g. at least a CPU), the memory 238, the battery 239; and the optional at least one interface(s) 240 to enable a fully functional tracking device. Such a tracking device may for instance be (e.g. directly) printed to e.g. a parcel or delivery box, or a shipping label that can be attached (e.g. glued) to such a parcel or delivery box. In this way, possibilities to track anything at economical scale, e.g. as shown in the example embodiments in FIG. 1 by the apparatus(es) 130, 130-1, 130-2, 130-3, 130-4 is enabled.

It will be understood that according to example embodiments of all exemplary aspects of the present invention, all of the components 231 to 240 are printed. Further, there may be ample embodiments of all exemplary aspects of the present invention in which not all of the components 231 to 240 are printed, but they may be integrated in or attached to the apparatus 230 via the at least one interface(s) 240. In this way, one or more components of the components 231 to 239 may for instance be integrated into e.g. a parcel or delivery box, or a shipping label by being electrically connected to the apparatus 230.

Figure 3:
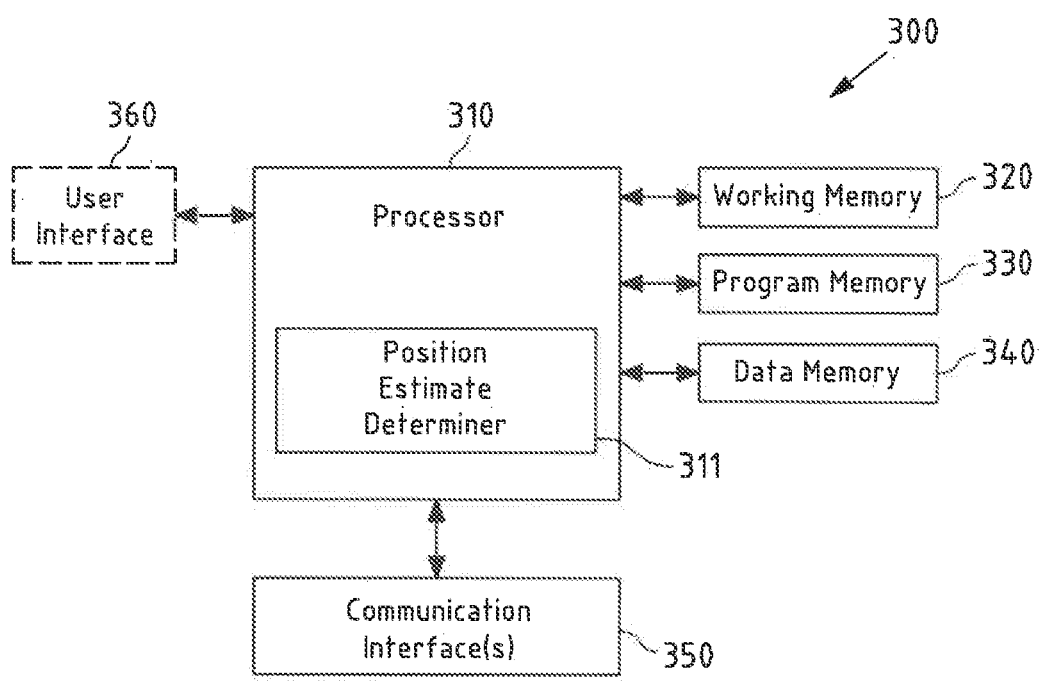
FIG. 3 a schematic block diagram of an apparatus configured to determine a position estimate according to the first exemplary aspect of the present invention.

FIG. 3 is a schematic block diagram of an apparatus 300 according to an exemplary aspect of the present invention, which may for instance represent the apparatus(es) 130, 130-1, 130-2, 130-3, 130-4 of FIG. 1, or the apparatus 230 of FIG. 2. The schematic block diagram of the apparatus 300 according to an exemplary aspect of the present invention may for instance represent an IoT-device, a low-capability device, or a tracking device.

Apparatus 300 comprises a processor 310, working memory 320, program memory 330, data memory 340, communication interface(s) 350, and an optional user interface 360.

Apparatus 300 may for instance be configured to perform and/or control or comprise respective means (at least one of 310 to 360) for performing and/or controlling a determining of at least one position estimate. Apparatus 300 may as well constitute an apparatus comprising at least one processor (310) and at least one memory (320) including computer program code, the at least one memory and the computer program code configured to, with the at least one processor, cause an apparatus, e.g. apparatus 300 at least to perform and/or control a determining of at least one position estimate.

Processor 310 may for instance comprise a position estimate determiner 311 as a functional and/or structural unit. Position estimate determiner 311 may for instance be configured to determine a position estimate. Processor 310 may for instance further control the memories 320 to 340, the communication interface(s) 350, and the optional user interface 360.

Processor 310 may for instance execute computer program code stored in program memory 330, which may for instance represent a computer readable storage medium comprising program code that, when executed by processor 310, causes the processor 310 to perform the determining of at least one position estimate.

Processor 310 (and also any other processor mentioned in this specification) may be a processor of any suitable type. Processor 310 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 310 may for instance be an application processor that runs an operating system.

Program memory 330 may also be included into processor 310. This memory may for instance be fixedly connected to processor 310, or be at least partially removable from processor 310, for instance in the form of a memory card or stick. Program memory 330 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 330 may also comprise an operating system for processor 310. Program memory 330 may also comprise a firmware for apparatus 300.

Apparatus 300 comprises a working memory 320, for instance in the form of a volatile memory. It may for instance be a Random Access Memory (RAM) or Dynamic RAM (DRAM), to give but a few non-limiting examples. It may for instance be used by processor 310 when executing an operating system and/or computer program.

Data memory 340 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 340 may for instance store one or more position estimates, one or more pieces of radio map data, or the like, to name but a few non-limiting examples. The apparatus 300 may for instance determine the at least one position estimate by a positioning. The positioning may function in two modes. The first mode is a terminal-assisted mode, in which the apparatus 300 (e.g. as a (physical) tracking device) performs measurements of the cellular and/or non-cellular air interface (e.g. via the communication interface(s) 350), and provides the measurements to a remote server (e.g. server 110 of FIG. 1), which in turn provides the position estimate back to the apparatus 300.

The second mode is the terminal-based mode, in which the apparatus 300 (e.g. as a (physical) tracking device) has a local copy of a radio map respectively one or more pieces of radio map data (or most likely, a subset of a global radio map). The apparatus 300 performs measurements of the cellular and/or non-cellular air interface (e.g. via the communication interface(s) 350), and determines the position estimate, e.g. at least partially based on the one or more pieces of radio map data. Within the meaning of the present invention, both the terminal-assisted mode and the terminal-based mode may be utilized to determine the at least one position estimate.

Communication interface(s) 350 enable apparatus 300 to communicate with other entities, e.g. with server 110 of FIG. 1. The communication interface(s) 350 may for instance comprise a wireless interface, e.g. a cellular radio communication interface and/or a WLAN interface), for instance to communicate with entities via the Internet. Communication interface(s) may enable apparatus 300 to communicate with one or more other entities, as far as the one or more other entities are enabled to communicate via a respective wireless interface.

User interface 360 is optional and may comprise a display for displaying information to a user and/or an input device (e.g. a keyboard, keypad, touchpad, mouse, etc.) for receiving information from a user. The optional user interface 360 may alternatively be connectable to the apparatus 300.

Some or all of the components of the apparatus 300 may for instance be connected via a bus. Some or all of the components of the apparatus 300 may for instance be combined into one or more modules.

The following embodiments shall also be considered to be disclosed:

A method and apparatus to track assets such that the tracking device is (e.g. fully) printed to the asset or to a shipping label of the asset, wherein the printed tracker consists at least one of antenna;
radio for connectivity & positioning;
CPU/ASIC/FPGA for processing;
memory to store the firmware;
battery;

wherein the tracking device is for one-time use.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. An apparatus, comprising:
    at least one antenna;
    a positioning system;
    a Radio Frequency (RF) filter;
    a carrier; and
    a printed memory;
    wherein the carrier comprises the at least one antenna configured to observe signals that are then filtered by the RF filter, wherein the RF filter is formed by printing the RF filter on or to the apparatus, and wherein the at least one antenna is formed by printing the at least one antenna on or to the carrier;
        wherein the carrier is attachable to an asset to be tracked and at least partially comprises paper or cardboard,
        wherein the positioning system is configured to enable determining of at least one position estimate indicative of a current position of the apparatus,
        wherein the at least one position estimate is determined, at least in part, based on one or more signals observable by the at least one antenna,
        wherein the positioning system is configured to enable a first mode, comprising a terminal-assisted mode, and a second mode, comprising a terminal-based mode, for determining the at least one position estimate, and
        wherein in the second mode the apparatus is configured to receive one or more pieces of radio map data, from a remote server, corresponding to an area of interest around the current position of the apparatus and store the one or more pieces of radio map data in the printed memory.

2. The apparatus according to claim 1, further comprising:
    at least one energy storage; and/or
    at least one interface for connection with at least one integrated circuit, and
    at least one integrated circuit comprising at least one processor and at least one memory including computer program code, the at least one memory and the computer program code configured to, with the at least one processor, cause the apparatus to at least perform the determining of the at least one position estimate,
    wherein the at least one integrated circuit is electrically coupled to the at least one interface.

3. The apparatus according to claim 2, the at least one memory and the computer program code configured to, with the at least one processor, cause the apparatus further to perform:
    providing the at least one position estimate.

4. The apparatus according to claim 1, wherein the carrier is or is a part of one of following:
    a shipping label attached to the asset to be tracked;
    a cardboard comprised by the asset to be tracked;
    a packaging of the asset to be tracked; or
    the asset to be tracked.

5. The apparatus according to claim 1, wherein the carrier is removable from the asset to be tracked.

6. The apparatus according to claim 2, wherein one or more of the at least one energy storage, the at least one interface, and the at least one integrated circuit are printed on or to the carrier.

7. The apparatus according to claim 1, wherein the apparatus is an Internet-of-Things device, or a low-capability device, or a tracking device.

8. A method for producing an apparatus, the method comprising:
    providing a carrier;
    providing a printed memory;
    printing at least one antenna on or to the carrier;
    printing a Radio Frequency (RF) filter on or to the apparatus, wherein the RF filter is configured to filter signals observed by the at least one antenna;
    wherein the at least one antenna is comprised by the carrier; and
    providing attachable means to the carrier enabling the carrier to be attachable to an asset to be tracked, wherein the carrier at least partially comprises paper or cardboard,
    wherein the apparatus comprising the carrier and the at least one antenna is configured to enable determining, via a positioning system, of at least one position estimate indicative of a current position of the apparatus at least partly based on one or more signals observable by the at least one antenna,
    wherein the apparatus comprising the carrier and the at least one antenna is configured to enable determining of the at least one position estimate with the positioning system configured to operate in a respective one of a first mode, comprising a terminal-assisted mode, and a second mode, comprising a terminal-based mode, and wherein in the second mode the apparatus is configured to:
receive one or more pieces of radio map data, from a remote server, corresponding to an area of interest around the current position of the apparatus and store the one or more pieces of radio map data in the printed memory; and
determine, via the positioning system, the at least one position estimate using a local copy of the one or more pieces of radio map data from the printed memory.

9. The method according to claim 8, further comprising:
printing at least one energy storage on or to the carrier; and/or
printing at least one interface on or to the carrier, wherein the at least one interface is configured for a connection with at least one integrated circuit; and
electrically coupling at least one integrated circuit to the at least one interface.

10. The method according to claim 8, further comprising:
printing at least one integrated circuit on or to the carrier.

11. The method according to claim 9, wherein the at least one integrated circuit comprises at least one processor and at least one memory including computer program code, the at least one memory and the computer program code configured to, with the at least one processor, cause the apparatus to at least perform the determining of the at least one position estimate.

12. The method according to claim 8, further comprising: attaching the carrier to an asset to be tracked.

13. The method according to claim 8, wherein the carrier is a part of an asset to be tracked.

14. The method according to claim 8, wherein providing the attachable means to the carrier comprises providing adhesive, a frictional connection or an interlocking connection to the carrier.

15. A method comprising:
providing an apparatus comprising at least one antenna, a positioning system, a printed memory, and a carrier, wherein the carrier comprises the at least one antenna, wherein the at least one antenna is formed by printing the at least one antenna on or to the carrier, and wherein the carrier is attachable to an asset to be tracked within a package, and providing, in an instance in which the package comprises two or more assets to be tracked, another apparatus that is printed to the package to enable tracking of the two or more assets; and determining, via the positioning system, at least one position estimate indicative of a current position of the apparatus based, at least in part, on one or more signals observable by the at least one antenna,
wherein determining the at least one position estimate comprises determining the at least one position estimate with the positioning system that is configured to operate in a respective one of a first mode and a second mode for determining the at least one position estimate,
wherein in the first mode, comprising a terminal-assisted mode, the apparatus is configured to:
perform, via the positioning system, one or more measurements of a cellular or non-cellular air interface; and
provide the one or more measurements to a remote server to prompt a return of the at least one position estimate, and
wherein in the second mode, comprising a terminal-based mode, the apparatus is configured to:
receive one or more pieces of radio map data, from a remote server, corresponding to an area of interest around the current location of the apparatus and store the one or more pieces of radio map data in the printed memory; and
determine, via the positioning system, the at least one position estimate using a local copy of the one or more pieces of radio map data from the printed memory.

16. The method of claim 15, further comprising providing the at least one position estimate.

17. The method according to claim 15, wherein the carrier is or is a part of one of following:
a shipping label attached to the asset to be tracked;
a cardboard comprised by the asset to be tracked;
a packaging of the asset to be tracked; or
the asset to be tracked.

18. The method according to claim 15, wherein the carrier is removable from the asset to be tracked.

19. The method according to claim 15, wherein the apparatus that is provided further comprises at least one integrated circuit comprising at least one processor and at least one memory including computer program code, the at least one memory and the computer program code configured to, with the at least one processor, cause the apparatus to determine the at least one position estimate.

20. The apparatus according to claim 15, wherein the apparatus is an Internet-of-Things device, or a low-capability device, or a tracking device.

* * * * *